US006336863B1

(12) United States Patent
Baerlocher et al.

(10) Patent No.: US 6,336,863 B1
(45) Date of Patent: Jan. 8, 2002

(54) GAMING DEVICE WITH BONUS MECHANISM

(75) Inventors: Anthony J. Baerlocher; Joseph E. Kaminkow; Aaron T. Jones, all of Reno, NV (US)

(73) Assignee: International Game Technologies, Reno, NV (US)

( * ) Notice: Subject to any disclaimer, the term of this patent is extended or adjusted under 35 U.S.C. 154(b) by 0 days.

(21) Appl. No.: 09/394,494

(22) Filed: Sep. 13, 1999

(51) Int. Cl.[7] .............................. A63F 9/24; A63F 13/00

(52) U.S. Cl. ................. 463/27; 273/141 R; 273/143 R; 463/20; 463/16

(58) Field of Search ............................... 463/16–22, 25, 463/26, 27; 273/134 R, 143 R, 138.1, 138.2, 141 R, 142 R, 142 H, 142 HA, 138 A

(56) References Cited

U.S. PATENT DOCUMENTS 5,584,763 A * 12/1996 Kelly et al. .................... 463/16
5,848,932 A * 12/1998 Adams ......................... 463/20
5,947,820 A * 9/1999 Morro et al. .................. 463/9

* cited by examiner

*Primary Examiner*—Jessica J. Harrison
*Assistant Examiner*—Alex F. R. P. Rada, II
(74) *Attorney, Agent, or Firm*—Marshall, O'Toole, Gerstein, Murray & Borun

(57) ABSTRACT

A gaming machine such as a slot machine with a bonus game is provided. The bonus indicator displays the possible bonus award before it is determined whether or not the bonus has been earned.

6 Claims, 5 Drawing Sheets

GAMING DEVICE WITH BONUS MECHANISM

FIELD OF THE INVENTION

The present invention is directed to apparatus and methods for gaming devices, especially slot machines, poker machines and the like.

BACKGROUND OF THE INVENTION

It is known in gaming devices to provide a bonus game in addition to the main game involving reels or displays of simulated cards. Typically, however, the bonus mechanism operates after the main gaming unit and the player already knows whether or not he has qualified to earn a bonus. Although such games have achieved popularity and success, it is believed that it may be preferable to have a game in which the bonus award selector operates to indicate the bonus award even if the bonus may not be awarded. It is believed that some players will find that such a game is more exciting to play and that additional play may be encouraged.

It is therefore an object of the present invention to provide a gaming machine which includes a bonus mechanism which selects and displays the bonus award prior to a determination as to whether or not the bonus will be awarded.

SUMMARY OF THE INVENTION

In accordance with the present invention, a gaming machine is provided having a main payout display with a plurality, usually three or more, main payout indicia. A bonus award display includes a bonus selector which selects and displays a bonus award prior to all of said main payout indicia being selected and displayed. A control system provides the bonus award if one of one or more preselected displays of main payout indicia is displayed on the main payout display. Thus, a possible bonus award is selected and displayed before the main payout display completes its display and the player knows whether or not the bonus award will be received.

The main payout display could be reels, simulated reels, simulated cards, or some other form of gaming device. In an illustrative embodiment, the main payout display is in the form of five simulated reels. The bonus award display is a bonus wheel and a bonus selector which is a mechanical, movable pointer.

One embodiment of a gaming machine of the present invention has three or more main payout reels with indicia displayed on the outer periphery of the reels. It includes a bonus award reel with a plurality of bonus indicia displayed substantially transverse to the axis of the reel. A controller causes the bonus award reel to spin coincidentally with one or more main payout reels and stops the bonus award reel prior to stopping all of the main payout reels. The bonus award is provided to the player if one of one or more preselected displays of indicia is displayed on the main payout reels.

In accordance with the present invention, a method of gaming is provided which includes activating a game machine, providing a main payout display of a plurality of main payout indicia with symbols, providing a bonus display of a bonus selector, selecting and displaying a bonus award, completing the main payout display and awarding the bonus if one of one or more preselected displays of main payout indicia are displayed on the main payout display.

A more detailed description of illustrative embodiments of the invention is provided in the following description and claims, and is illustrated in the accompanying drawings.

DETAILED DESCRIPTION OF THE ILLUSTRATIVE EMBODIMENTS

Figure 1:
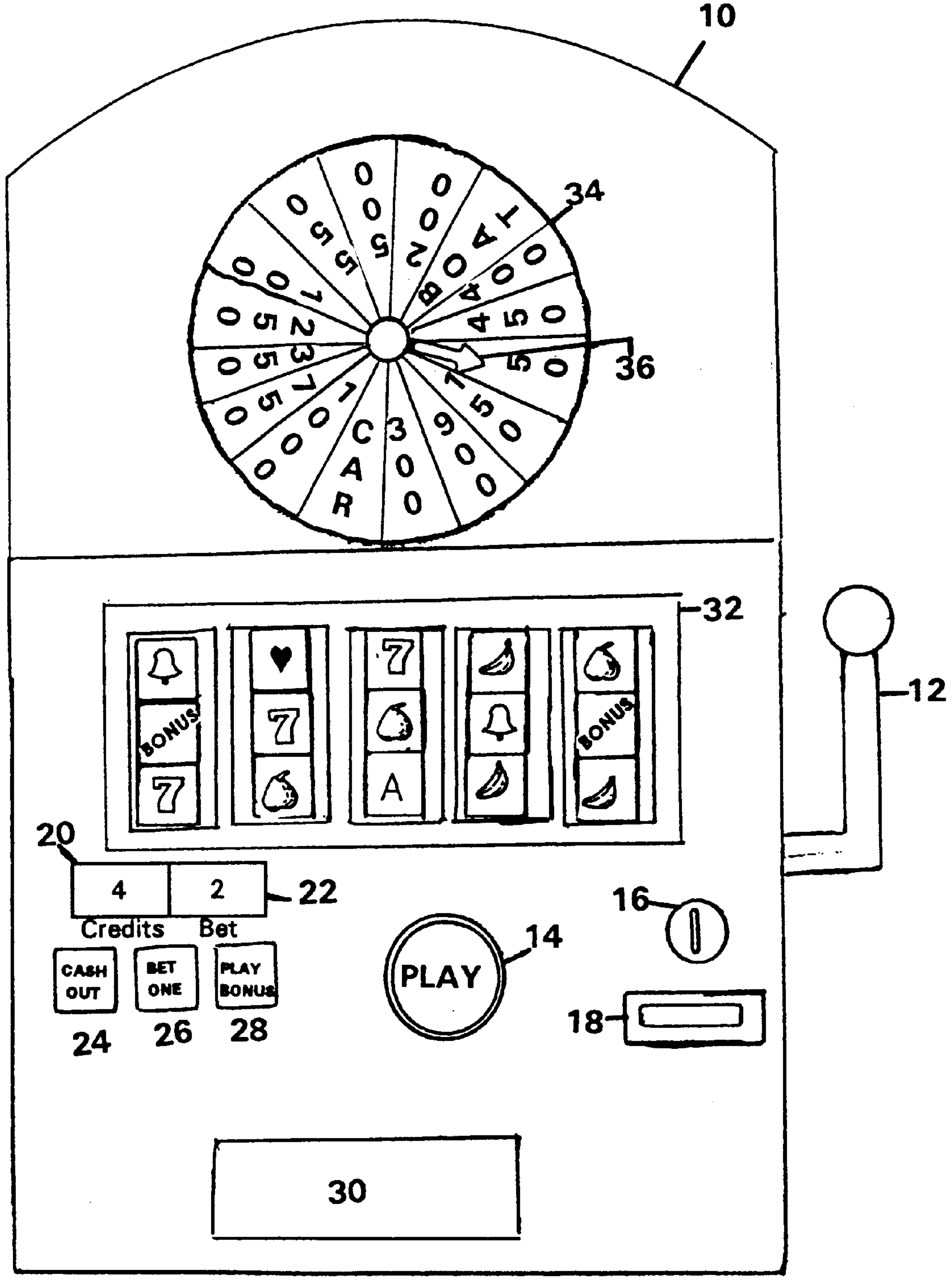
FIG. 1 is a front view of an illustrative embodiment of a slot machine incorporating certain elements of the invention.

Referring to FIG. 1, a stylized slot machine 10 which illustrates one embodiment of a gaming machine incorporating elements of the present invention is shown. The slot machine 10 includes appropriate hardware and software necessary to operate the gaming machine in accordance with the apparatus and methods of the invention.

The slot machine 10 includes an arm 12 which may be pulled by the player. The slot machine 10 also includes a button 14 which may be pushed by the player and serves the same function as the arm 12.

The player operates the slot machine 10 by placing coins in the coin slot 16 or paper money in the bill acceptor 18. Of course, other means of accepting payment such as readers or validators for credit cards or debit cards could be used.

When a player puts money in the slot machine 10, the number of credits corresponding to the amount deposited is shown in the credit display 20. The slot machine 10 also includes a bet display 22. As the player places his bet, the number of credits as shown in credit display 20 is decremented and the amount of the bet in bet display 22 is incremented. A player may cash out or receive a number of coins corresponding to the number of credits at any time by pushing the button 24.

The player places his bet by pushing the button 26. By repeatedly pushing the button 26, the player can increase the bet by an amount equal to one credit for each time the button is pushed.

If the player wishes to be eligible to win the bonus award, the player would select to do so by pushing button 28. An additional credit may be charged when button 28 is pushed and the button 28 may be lit to indicate the player's election.

The slot machine 10 includes coin payout tray 30 wherein the player receives a number of coins corresponding to his credits when button 24 is pushed. Of course, other payout mechanisms could be used. Credit slips which could be redeemed by a cashier could be used. Credits could be electronically recorded on a debit card or an amount could be credited to a credit card account.

The slot machine 10 has a main payout display 32 which in this illustrative embodiment includes five reels. The indicia on the reels can include common symbols, such as bells, hearts, fruits, numbers, letters, bars, etc. Preferably, the indicia on the reels would be chosen in accordance with the game theme. A bonus symbol is included among the indicia on the two outside reels.

The slot machine 10 includes a bonus award display with a bonus wheel 34. The bonus wheel 34 is divided into a plurality of wedge-shaped sections indicating bonus awards. In addition to awards comprised of numbers of coins or credits, the bonus awards could be articles such as a car or a boat. A bonus selector 36 in the form of a rotating pointer is positioned in the center of the bonus wheel.

It should be understood that the slot machine 10 would include elements not illustrated in the drawing. These elements include a controller such as a microprocessor or central processing unit (CPU) with appropriate software. The slot machine 10 would also be decorated with graphics and lights and have customized sounds in accordance with the game theme which could, for example, be a popular television program or movie.

In addition, the reels in main payout display 32, the bonus wheel 34, and the bonus selector 36 can be real or simulated. In the presently preferred embodiment, the main payout display 32 is a television or computer monitor such as a CRT (cathode ray tube) or LCD (liquid crystal display) and the reels are simulated. The bonus award display includes the bonus wheel 34 which is integral to the cabinet and the bonus selector 36 which is a mechanical, movable pointer.

The main game could also be a simulated card game in which indicia representing playing cards are displayed. In this embodiment, one or more preselected displays in the main game earn the bonus. For example, in a 3 reel or card game, three of a kind earns the bonus. In a 5 reel or card game, a full house earns the bonus. As in the other embodiments, the possible bonus would be selected and displayed before the main game display would indicate whether or not the player had qualified to receive the bonus.

The bonus award display could be any mechanical means or simulated (such as by a video display) representation in which values or prizes representing possible bonus awards are displayed and a bonus selector is a light or some other form of indicator or pointer. Of course, the mechanical or simulated display of values or prizes could move or simulate movement and the indicator could be stationary.

In one alternative embodiment, the main payout display and the bonus award display both include reels. The reels used in the main payout display are positioned so that indicia on the outer periphery are shown. The reel used in the bonus award display is positioned transverse to the main payout display reels. The bonus selector is a stationary pointer positioned adjacent the periphery of the reel. The bonus awards are displayed in wedge-shaped sections substantially transverse to the axis of the reel. A controller signals the bonus award reel to spin coincidentally with one or more payout reels. The bonus reel is stopped before all of the main payout reels are stopped. The controller provides the bonus award if one of one or more preselected displays of indicia is displayed on the main payout reels.

Game play and operation will be discussed and illustrated using the illustrative embodiment in FIG. 1 as an example. The player would begin by placing coins or bills into the slot machine 10. The amount deposited would be represented by credits displayed on the credit display 20. The player would place bets of one or more credits by pressing button 26. If the player desired to be eligible to earn the bonus award, the player would press button 28. Then, the player either pulls the arm 12 or pushes the button 14 to activate the game.

Figure 2:
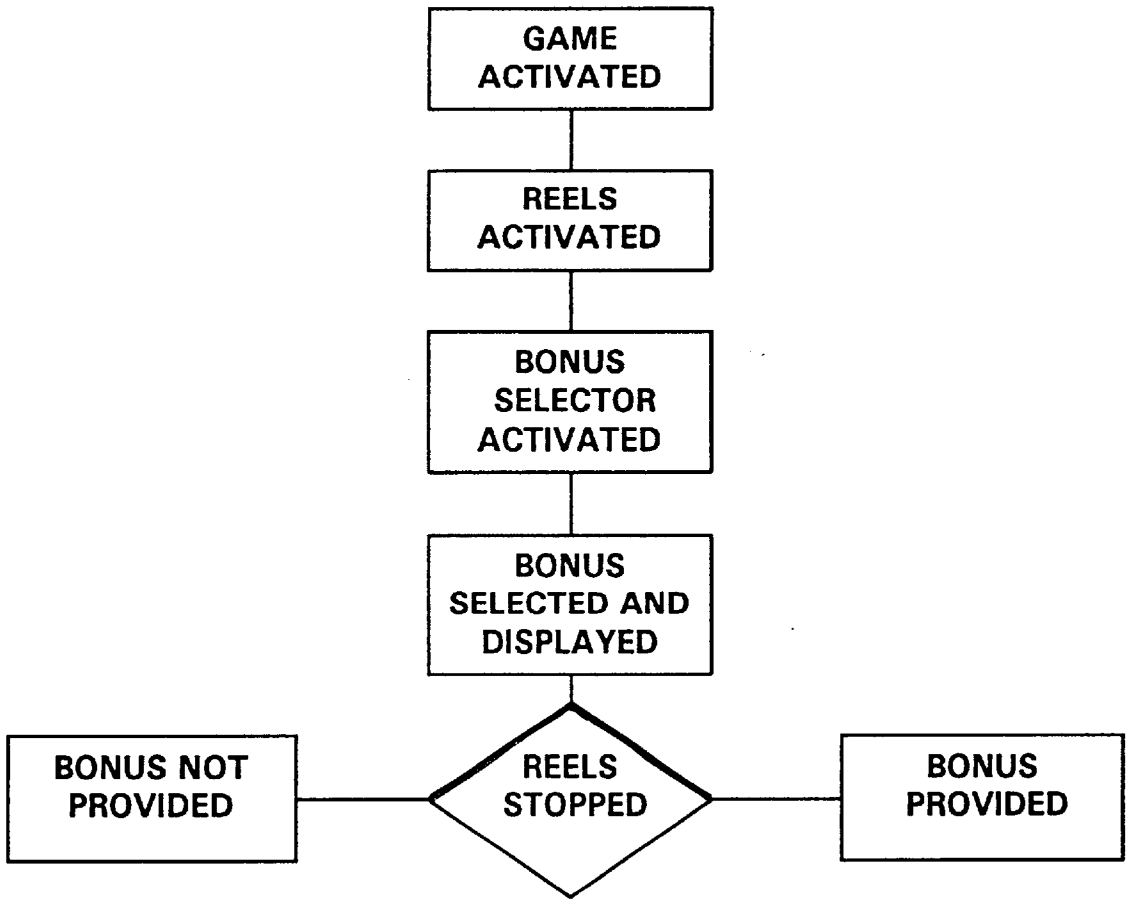
FIGS. 2–4 are flow diagrams depicting operation of illustrative embodiments of the invention.

After the game is activated, a number of alternative methods of game operation are contemplated. In an alternative as described in the flow chart of FIG. 2, the reels and the bonus selector are activated and begin to spin. Before all the reels stop spinning, the bonus indicator would stop. Thus, before the player would know whether or not the bonus was earned, the possible bonus would be selected and displayed. Thereafter, any reels which were still spinning would stop. If matching bonus symbols were displayed in an eligible pay line, the player would receive the bonus in addition to whatever prize was otherwise appropriate based upon the pay table associated with the symbols displayed on the reels.

Figure 3:
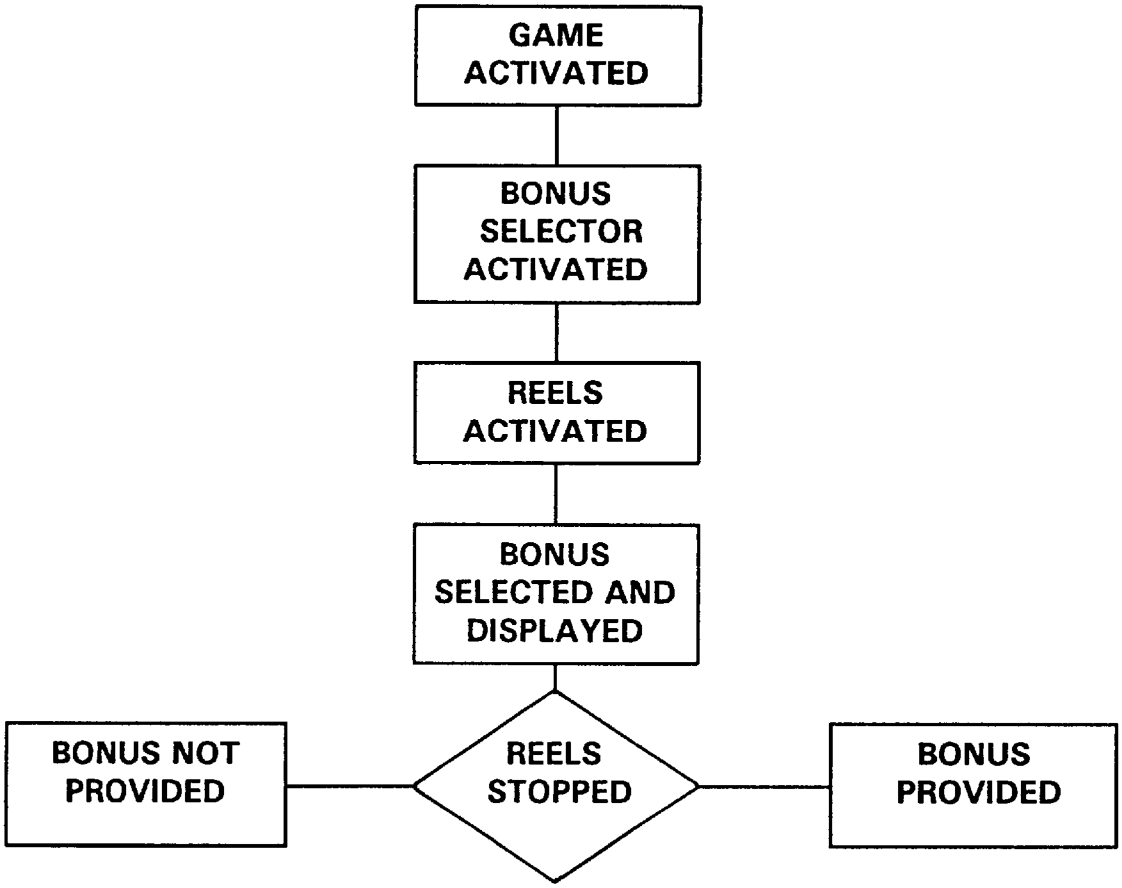

An alternative method of operation is described in the flow chart of FIG. 3. In this alternative, the bonus selector is activated and then the reels are activated. The possible bonus is then selected and displayed prior to the reels stopping and indicating whether or not the bonus is earned.

Figure 4:
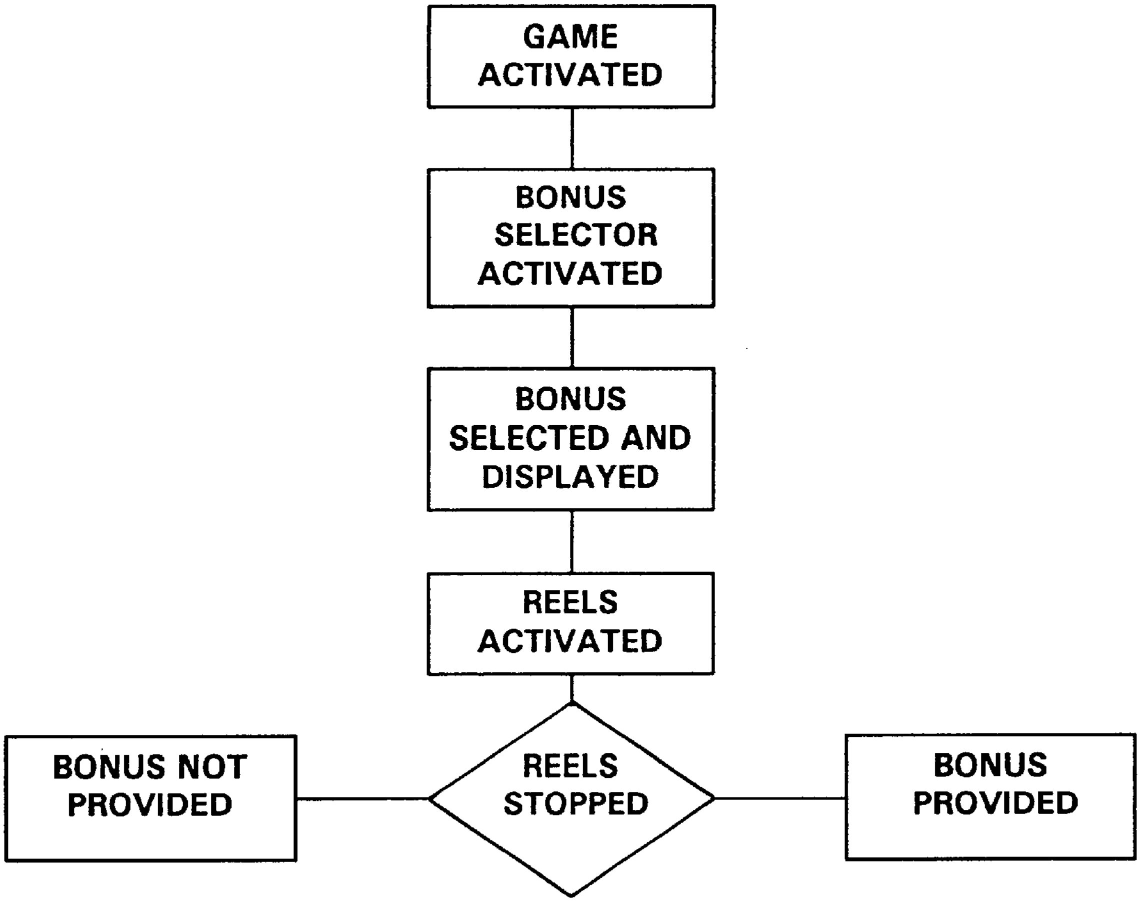

A further alternative is described in the flow chart of FIG. 4. In this alternative, the bonus selector is activated and the bonus is selected and displayed prior to the reels being activated.

In the presently preferred embodiment, the reels are activated and all the reels begin to spin. The bonus selector is activated and begins to spin before any reels stop. The first reel is then stopped. If a bonus symbol appears in an eligible pay line on the first reel, special indicator lights and sounds would be provided. These lights and sounds would continue during the time the second, third and fourth reel are stopped. Prior to the fifth and final reel stopping, the bonus indicator stops and the possible bonus is selected and displayed. If the final reel stops with the bonus symbol displayed in an eligible play line, the player earns the previously selected and displayed bonus and alternative or additional lights and sounds could be provided. And, if a particularly expensive bonus prize were earned, such as a boat or car, especially dramatic lighting and sounds could be provided.

Figure 5:
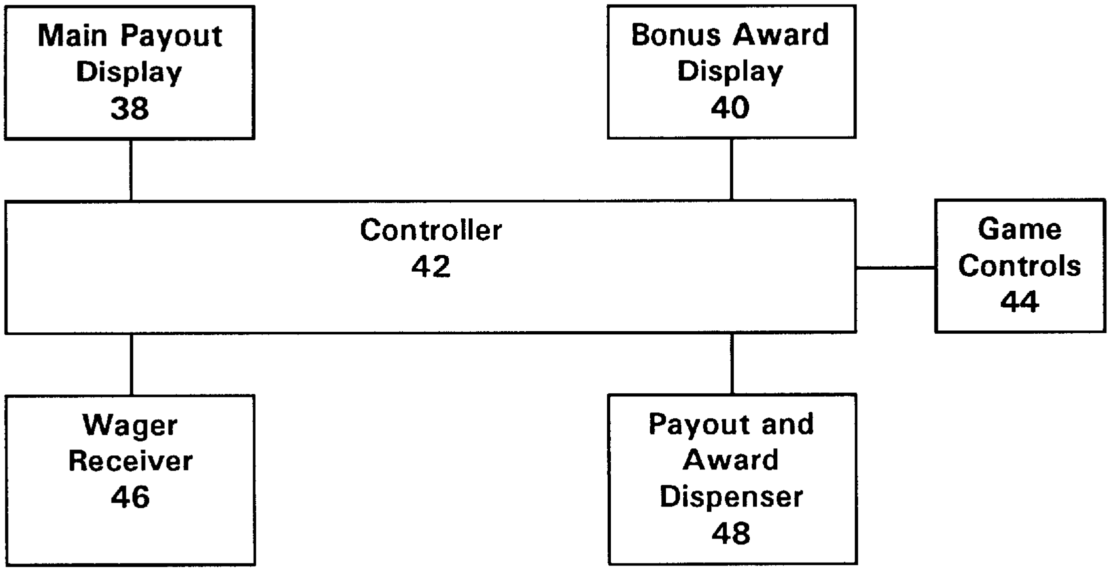
FIG. 5 is a block diagram of a gaming machine including elements of an illustrative embodiment of the invention.

Referring to FIG. 5, the gaming machine includes main payout display 38 and bonus award display 40. These displays could be real (reels, wheels, pointers, etc.) or simulated (CRT's, LCD's, etc.) or some combination of real and simulated displays. The displays receive signals from the controller 42. In this block diagram, controller 42 represents all mechanical and electronic hardware and all software necessary to operate a gaming machine of the present invention other than that otherwise represented in this diagram. The game controls 44 represents the buttons, arms, keyboards and switches the player uses to enter his game play selections into the machine and activate game play. The wager receiver 46 represents mechanical and electronic means for accepting money and other forms of payment. The payout and award dispenser 48 represents counterpart means for dispensing payouts and awards from the main and the bonus games.

Although certain illustrative and preferred embodiments of the invention have been described, it is to be understood that various modifications and substitutions may be made by those skilled in the art without departing from the novel spirit and scope of the present invention.

What is claimed is:

1. A gaming machine comprising:

a main payout display comprising a plurality of main payout indicia;

a bonus award display comprising a bonus selector which selects and displays a bonus award prior to all of said main payout indicia being selected and displayed; and a control system which provides said bonus award if one of one or more preselected displays of main payout indicia is displayed on said main payout display.

2. The gaming machine of claim 1 wherein said main payout display is selected from the group consisting of reels, simulated reels and simulated cards.

3. The gaming machine of claim 2 wherein said main payout display comprises five simulated reels.

4. The gaming machine of claim 1 wherein the said bonus award display further comprises a bonus wheel and said bonus selector comprises a movable pointer.

5. A gaming machine comprising:

a plurality of main payout reels with indicia displayed on the outer periphery of said reels;

a bonus award reel with a plurality of bonus indicia displayed substantially transverse to the axis of said reel; and a controller which causes said bonus award reel to spin coincidentally with one or more main payout reels and stops said bonus award reel prior to stopping all of said main payout reels and which awards a selected bonus if one of one or more preselected displays of indicia is displayed on said main payout reels.

6. A method of gaming comprising:

activating a game machine;

providing a main payout display with a plurality of main payout indicia;

providing a bonus display comprising a bonus selector:

selecting and displaying a bonus award prior to selecting said main payout indicia;

completing said main payout display; and awarding said bonus if one or one or more preselected displays of main payout indicia are displayed on said main payout display.

* * * * *